United States Patent [19]

Bueno

[11] Patent Number: 4,616,882
[45] Date of Patent: Oct. 14, 1986

[54] BRAKE ARRANGEMENT FOR HYDRAULICALLY POWERED VEHICLES

[75] Inventor: Alfredo Bueno, Sao Paulo-Sp, Brazil

[73] Assignee: Dynapac AB, Solna, Sweden

[21] Appl. No.: 645,928

[22] Filed: Aug. 30, 1984

[30] Foreign Application Priority Data

Sep. 1, 1983 [SE] Sweden .............................. 8304730.8

[51] Int. Cl.⁴ .............................................. B60T 11/28
[52] U.S. Cl. ..................................... 303/68; 188/170; 303/6 M
[58] Field of Search ................... 188/170; 303/6 M, 9, 303/10, 68

[56] References Cited

U.S. PATENT DOCUMENTS

| | | | |
|---|---|---|---|
| 3,195,692 | 7/1965 | Herr et al. | 188/170 |
| 3,528,707 | 9/1970 | Casey | 188/170 X |
| 3,770,085 | 11/1973 | Cottingham | 188/170 X |
| 3,985,210 | 10/1976 | Hodge et al. | 188/170 |

Primary Examiner—Duane A. Reger
Attorney, Agent, or Firm—Walter Ottesen

[57] ABSTRACT

The invention is directed to a fail-safe brake arrangement for hydraulically powered road rollers. The operating means of the brake system are completely separate from the normal road brake of the roller thereby enabling the fail-safe brake to be manually operated by the driver in an emergency situation. The brake also operates automatically as soon as the hydraulic system of the roller ceases to function. The fail-safe brake according to the invention utilizes the oil pressure to compress one or more springs in a spring brake chamber. As soon as the oil pressure falls to zero or below a certain value, the energy stored in the springs is utilized to apply the brake and bring the vehicle to a halt.

1 Claim, 2 Drawing Figures

BRAKE ARRANGEMENT FOR HYDRAULICALLY POWERED VEHICLES

FIELD OF THE INVENTION

The invention relates to a brake arrangement for hydraulically powered vehicles and is particularly concerned with a fail-safe brake for hydraulically powered road rollers.

BACKGROUND OF THE INVENTION

A fail-safe brake on vehicles on the type concerned is understood to mean a brake system intended in the event of a fault in the normal vehicle brake or "road brake" to reduce the speed of the vehicle or to stop it altogether. For this purpose, the fail-safe brake system should have an operating means completely separated from the road brake and the operating means should be easy for the driver to reach and operate. Further requirements on the fail-safe brake system are that it must be operationally reliable and that the risk of faults occurring in the fail-safe brake system is virtually eliminated.

SUMMARY OF THE INVENTION

The fail-safe brake arrangement according to the invention works on the same principle as a conventionl dead-man's grip; that is, it operates automatically as soon as the hydraulic system of the vehicle ceases to function. This is essential in that the road brake normally used on hydraulically powered vehicles is actuated hydraulically and the effective operation thereof is conditional on the hydraulic system being in order. The arrangement utilizes the oil pressure built up by the vehicle drive motor in the hydraulic system with the aid of the hydraulic pump which compresses one or a plurality of mechanical springs disposed in a hydraulic spring brake chamber incorporated in the hydraulic system. The energy stored in the springs is used to stop the vehicle if necessary.

At full oil pressure the springs are compressed and the brake incorporated in the fail-safe brake arrangement is released. If the oil pressure in the brake chamber is lost or becomes insufficient to overcome the spring force, the energy stored in the springs is used to apply the brake. Such a change in the oil pressure may be caused either by leakage in the oil system or by the driver applying the fail-safe brake.

BRIEF DESCRIPTION OF THE DRAWING

In the following, the invention will be described in more detail and with reference to the drawing wherein.

DESCRIPTION OF THE PREFERRED EMBODIMENTS OF THE INVENTION

Figure 1:
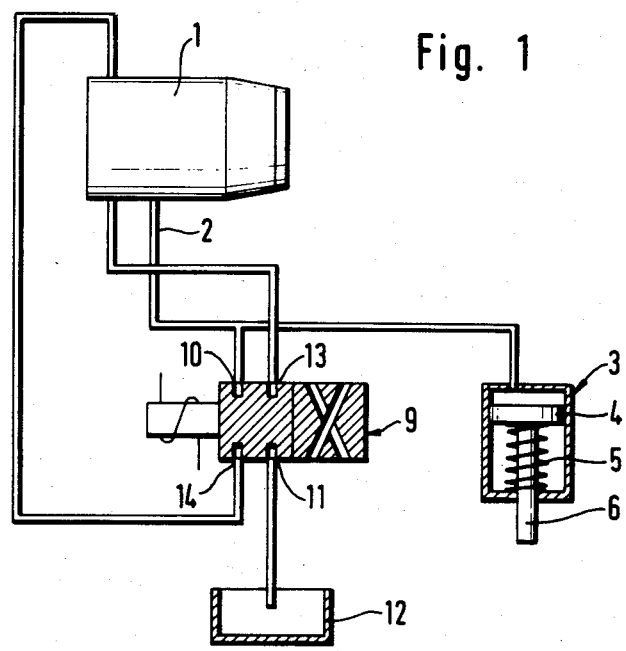
FIG. 1 is a schematic representation of the hydraulic circuit for the fail-safe brake arrangement according to the invention; and, FIG. 2 is an embodiment of a brake device connected to the hydraulic circuit shown in FIG. 1.
Figure 2:
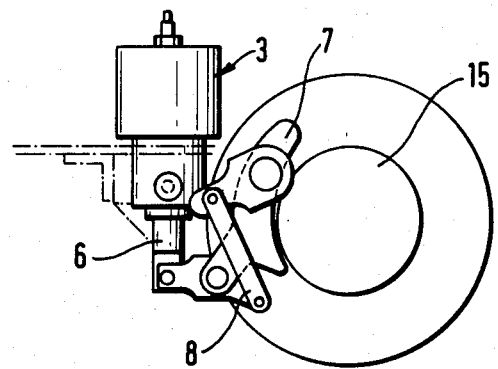

The fail-safe brake arrangement according to the invention includes a hydraulic pump 1 which provides a pressurized oil chamber 3 with hydraulic oil via line 2. Disposed within chamber 3 is a piston 4 which, when oil is pumped into chamber 3, is displaced within the cylinder against the force of a spring 5 thereby compressing the latter.

The piston rod 6 of piston 4 is pivotally connected to a linkage system 8 interacting with the fail-safe brake 7. At full oil pressure, piston 4 is moved so far into chamber 3 that the brake 7 is completely released. If the oil pressure is reduced or completely lost, for example, as a consequence of a ruptured oil line or some other form of leakage in the hydraulic system, piston 4 is forced back by spring 5 whereupon brake 7 is applied to drum 15 and the vehicle stops.

In order for the vehicle to be braked by application of the fail-safe brake also under circumstances other than when the hydraulic system ceases to function, the fail-safe brake arrangement incorporates a valve 9 which in the illustrated example is electrically actuated. When braking is required, the electrically actuated valve 9 is actuated causing port 10 to communicate with port 11. The oil in chamber 3 is then evacuated to tank 12 and brake 7 is applied by the spring force released in brake chamber 3.

At the same time as communication is provided between ports 10 and 11, valve ports 13 and 14 also communicate with each other. In this way, the propellant circuit is "shorted" thereby reducing the propellant torque as a consequence of which the vehicle stops without the driver having to bring the forward and reverse lever into the neutral position. Since the vehicle drive motor is not disengaged, it maintains its running speed and thus enables other hydraulic systems, for example, the steering system to function and permits the steerability of the roller to be maintained throughout the entire braking distance.

The invention provides a fail-safe brake arrangement for hydraulically powered road rollers which is completely mechanical and acts directly on the braking members of the roller. Consequently, the brake arrangement will be safer in comparison to brakes that are actuated hydraulically, for example, where there is always a risk of oil leakage. When the fail-safe brake arrangement according to the invention is actuated, it is true that the hydraulic propellant force (the transmission) is disengaged but the steerability of the roller is not lost, which is of importance in that the roller can thus be steered as it is brought to a halt.

It is understood that the foregoing description is that of the preferred embodiments of the invention and that various changes and modifications may be made thereto without departing from the spirit and scope of the invention as defined in the appended claims.

What is claimed is:
1. A brake arrangement for hydraulically powered vehicles comprising:
   hydraulic fluid tank means for supplying hydraulic fluid;
   a hydraulic cylinder;
   pump means for pumping said hydraulic fluid from said fluid tank means under pressure into said hydraulic cylinder;
   first hydraulic circuit means for connecting said cylinder directly to said tank means;
   spring means arranged in said cylinder;
   a piston in operative contact with said spring means and slideably engaging said cylinder so as to be displaceable from a first position whereat said piston holds said spring means in a charged condition under the pressure of said hydraulic fluid to a second position under the force of said spring means in response to a loss in pressure of said fluid; and, brake means for halting the vehicle, said brake means being operatively connected to said piston for movement from a relaxed position corresponding to said first position of said piston to a braking position corresponding to said second position of said piston;

second hydraulic circuit means for short-circuiting said pump means thereby reducing the hydraulic propellant force and yet enabling the same to continue to function; and, hydraulic switching valve means switchable from a deenergized condition to an energized condition; said valve means being connected into said first circuit means for opening the same to divert the fluid away from said hydraulic cylinder and into said tank means when switched into said energized condition thereby causing said brake to be moved into said braking position independently of any loss of pressure in said braking arrangement caused by leakage, said valve means also being connected into said second circuit means for opening the same when in said energized condition thereby short-circuiting said pump means by returning the fluid directly to the latter.

* * * * *